United States Patent Office 3,066,142
Patented Nov. 27, 1962

---

3,066,142
ESTERS OF PROTOVERINE
S. Morris Kupchan, Madison, Wis., assignor to Wisconsin Alumni Research Foundation, Madison, Wis., a corporation of Wisconsin
No Drawing. Filed July 11, 1960, Ser. No. 41,793
7 Claims. (Cl. 260—287)

The present invention relates to novel ester derivatives of protoverine.

The structures of the naturally occurring hypotensive protoverine esters, protoveratrine A and protoveratrine B have recently been elucidated. Kupchan, S. Morris et al., J. Am. Chem. Soc. 81, 1009 (1959); 82, 2616 (1960). These two alkaloids have been used to some extent in recent years for treatment of hypertension but the deterrent to wider use is the narrow range between their therapeutic and emetic doses. L. S. Goodman and A. Gilman "The Pharmacological Basis of Therapeutics," The MacMillan Co., New York, N. Y., 2nd edition, pp. 747–754 (1955); O. Krayer and V. A. Drill, "Pharmacology in Medicine," McGraw-Hill Book Co., New York, N. Y., 2nd edition, pp. 515–524 (1958).

GENERAL PROCEDURES

*Acylations with limited amounts of isobutyryl chloride or acetyl chloride.*—To the dry starting material in reagent grade pyridine (1 g. in ca. 10 ml. pyridine) cooled in an ice bath, was added slowly the specified quantity of acyl chloride. The flask was protected from moisture with a calcium chloride tube and placed in an ice-water bath which was allowed to warm gradually to room temperature. After 15–30 hours, the solution was transferred to a separatory funnel and treated with chloroform, ice-water, and dilute ammonium hydroxide to pH 8–9. The solution was extracted with chloroform 4 times; the combined extracts were dried over anhydrous sodium sulfate and evaporated to dryness under reduced pressure. To remove all traces of pyridine, the residue was repeatedly dissolved in benzene and evaporated to dryness.

*Methanolyses of 16-acetate esters.*—The ester (5 to 10 mg.) was dissolved in methanol (0.1 to 0.3 ml.) and left at room temperature in a corked flask. The course of the reaction was followed by paper chromatography using the solvent systems of Levine, J. et al., J. Am. Pharm. Assoc., 44, 543 (1955), and the methanolysis was interrupted when the mixture appeared to be most suitable for a column separation. The preparative-scale reaction was then run in the corresponding manner.

*Column separations on alumina.*—The partial acylations and methanolyses afforded mixtures of products. In all cases, separations were effected by chromatography on acid-washed alumina (20–25 g. per g. of alkaloid mixture). The solvent mixtures were selected on the basis of the $R_f$-values of the alkaloids, and generally ranged from benzene, benzene-chloroform, and chloroform, to mixtures of chloroform-methanol containing gradually increasing proportions of methanol. The acylations were usually accompanied by some discoloration. The colored material was generally small in quantity and the major proportion was either retained by the alumina or eluted with the first few fractions. Initial fractions collected were usually kept very small in order to separate the yellow or brown impurities in the forerun from easily-eluted colorless alkaloids.

*Recrystallizations.*—Most of the compounds obtained in crystalline form separated from acetone-petroleum ether or ether-petroleum ether, and the products were recrystallized for analysis at least once from the same solvents. Frequently, the resinous fractions obtained by evaporation of the solutions eluted from the columns contained slight residual amounts of yellow to brown contaminants. The colored material was separated from each resin by dissolution in a little ether or acetone and dropwise addition of petroleum ether to turbidity filtration at this point removed colored impurity and gave a colorless filtrate from which crystalline product separated on standing.

Melting points are corrected for stem exposure. Values of $[\alpha]_D$ have been approximated to the nearest degree. Ultraviolet absorption spectra were determined in 95% ethanol on a Cary recording spectrophotometer (model 11 MS). Infrared spectra were determined in chloroform on a Baird double beam recording spectrophotometer.

EXAMPLE 1

*Protoverine 6,15-diisobutyrate (II) and protoverine 3,6,15-triisobutyrate (III).*—These esters were obtained as the principal products of acylation of protoverine with 2.3 mole equivalents of isobutyryl chloride for 17 hours. The products were separated as described above. No indication of more highly acylated products was noted.

EXAMPLE 2

*Protoverine 3,7,16-triacetate 6,15-diisobutyrate (IV).*—Protoverine 6,15-diisobutyrate (II) (500 mg.) was treated with pyridine (3 ml.) and acetic anhydride (10 ml.) and the mixture was heated for 2.5 hours in a water bath at 80° C. Excess acetic anhydride was cautiously decomposed by dropwise addition of methanol (7 ml.) and the reaction mixture was worked up in the usual manner with ice-water, chloroform and ammonia. The residue obtained by evaporation of the chloroform solution to dryness was crystallized from acetone-petroleum ether in the form of colorless needles.

EXAMPLE 3

*Protoverine 3,6,15-triisobutyrate 7,16-diacetate (V).*—Acetylation of III by the procedure described for preparation of IV afforded the crystalline diacetate from acetone-petroleum ether.

EXAMPLE 4

*Protoverine 3,7-diacetate 6,15-diisobutyrate (VI).*—Protoverine 3,7,16-triacetate 6,15-diisobutyrate IV (1.8 g.) in methanol (75 ml.) was allowed to stand at room temperature for 60 hours. Evaporation to dryness and column separation gave fractions which were crystallized from acetone-petroleum ether and yielded VI in the form of large prisms.

EXAMPLE 5

*Protoverine 3,6,15-triisobutyrate 7-acetate (VII).*—Methanolysis of V (1.8 g.) by the procedure described for preparation of VI yielded VII in the form of colorless needles.

EXAMPLE 6

*Protoverine 3,6,16-triacetate 7,15-diisobutyrate (X) and protoverine 3,6,16-triacetate 15-isobutyrate (IX).*—Protoverine 3,6,16-triacetate (3.1 g.) in pyridine (100 ml.), J. Am. Chem. Soc., 82, 2242 (1960), was acylated with isobutyryl chloride (2.0 ml., ca. 4 mole equivalents). Workup and column separation in the usual manner yielded X as needles from acetone-petroleum ether, and IX as prisms from acetone-petroleum ether.

EXAMPLE 7

*Protoverine 3,6,7,16-tetraacetate 15-isobutyrate (XI).*—Acetylation of IX (500 mg.) by the procedure described for preparation of IV yielded crystalline XI from chloroform-petroleum ether.

EXAMPLE 8

*Protoverine 3,6-diacetate 7,15-diisobutyrate (XII).*—Methanolysis of X (700 mg.) followed by column separation yielded XII as prisms from acetone-petroleum ether.

EXAMPLE 9

*Protoverine 3,6,7-triacetate 15-isobutyrate (XIII).*—Methanolysis of XI (300 mg.) followed by column separation yielded XIII, crystallized from acetone-petroleum ether.

EXAMPLE 10

*Protoverine 3,7,15,16 - tetraacetate 6 - isobutyrate (XIX).*—Acetylation of protoverine 6-isobutyrate (1.0 g.), J. Am. Chem. Soc., 82, 2242 (1960) by the procedure described for the preparation of IV yielded XIX as clusters of prisms from acetone-petroleum ether.

EXAMPLE 11

*Protoverine 3,7,15-triacetate 6-isobutyrate (XVIII).*—Protoverine 3,7,15,16-tetraacetate 6-isobutyrate XIX (1.0 g.) in acetone (20 ml.) and methanol (40 ml.) was allowed to stand at room temperature for 60 hours. Column separation yielded XVIII as prisms from acetone-petroleum ether.

EXAMPLE 12

*Protoverine 3,6-diisobutyrate (XX).*—A solution of protoverine 14,15-acetonide 3,6-diisobutyrate (1.0 g.), J. Am. Chem. Soc., 82, 2242 (1960), in 2% hydrochloric acid (50 ml.) was allowed to stand at room temperature for 17 hours. The solution was made alkaline with ammonium hydroxide and extracted exhaustively with chloroform. The chloroform extract was dried over anhydrous sodium sulfate and evaporated to dryness under reduced pressure. The residue (XX) was crystallized from ether and recrystallized from acetone-petroleum ether.

EXAMPLE 13

*Protoverine 3,6 - diisobutyrate 7,15,16 - triacetate (XXI).*—Acetylation of XX (1.0 g.) by the procedure described for the preparation of IV yielded XXI, crystallized from ether.

EXAMPLE 14

*Protoverine 3,6-diisobutyrate 7,15-diacetate (XXII).*—Methanolysis of XXI (1.1 g.) by the procedure described for preparation of XVIII yielded XXII as prisms from acetone-petroleum ether.

EXAMPLE 15

*Protoverine 14,15-acetonide 3,16-diacetate 6-isobutyrate (XXIII).*—Acetylation of protoverine 14,15-acetonide 6-isobutyrate (6 g.), J. Am. Chem. Soc. 82, 2242 (1960), in pyridine (40 ml.) with acetic anhydride (50 ml.) by the procedure described for preparation of IV, followed by column purification, yielded XXIII from ether. Recrystallization from acetone-petroleum ether afforded hexagonal prisms.

EXAMPLE 16

*Protoverine 3,16-diacetate 6-isobutyrate (XXV).*—Mineral acid hydrolysis of XXIII (6 g.) by the procedure described for the preparation of XX, followed by column separation, yielded XXV. Recrystallization from acetone-petroleum ether afforded long colorless prisms.

EXAMPLE 17

*Protoverine 3,15,16-triacetate 6-isobutyrate (XXIV).*—Protoverine 3,16-diacetate 6-isobutyrate (XXV) (1.8 g.) in pyridine (40 ml.) was acetylated with acetyl chloride (0.3 ml., ca. 1.7 mole equivalents). Workup and column separation in the usual manner gave XXIV, crystallized from ether.

EXAMPLE 18

*Protoverine 3,61 - diacetate 6,7,15 - triisobutyrate (XXVI).*—Protoverine 3,16 - diacetate 6 - isobutyrate (XXV) (1.55 g.) in pyridine (50 ml.) was treated with isobutyryl chloride (1.6 ml., ca. 7 mole equivalents). Workup and column separation in the usual manner yielded chromatographically homogeneous XXVI. Crystallization from ether yielded colorless prisms.

EXAMPLE 19

*Protoverine 3,15,16 - triacetate 6,7 - diisobutyrate (XXVII).*—Protoverine 3,15,16-triacetate 6-isobutyrate (XXIV) (600 mg.) in pyridine (30 ml.) was treated with isobutyryl chloride (0.8 cc., ca. 9 mole equivalents). Workup and column fractionation in the usual manner gave XXVII which resisted all attempts at crystallization.

EXAMPLE 20

*Protoverine 3,15 - diacetate 6,7 - diisobutyrate (XXVIII).*—Methanolysis of XXVII (210 mg.) by the procedure described for preparation XIII yielded 120 mg. of chromatographically pure XXVIII.

EXAMPLE 21

*Protoverine 3,acetate 6,7,15-triisobutyrate (XXIX).*—Methanolysis of XXVI (650 mg.) followed by column separation yielded chromatographically - homogeneous amorphous XXIX.

EXAMPLE 22

*Protoverine 3,6-diisobutyrate 15-acetate (XXX).*—Protoverine 3,6-diisobutyrate (XX) (1.1 g.) in pyridine (40 ml.) was treated with acetyl chloride (0.3 cc., ca. 2.5 mole equivalents). Workup and column separation in the usual manner yielded XXX as needles from ether.

EXAMPLE 23

*Protoverine 3,6,7-triisobutyrate 15-acetate (XXXI).*—Protoverine 3,6-diisobutyrate 15-acetate (XXX) (300 mg.) in pyridine (10 ml.) was treated with isobutyryl chloride (0.3 ml., ca. 7 mole equivalents). Workup and column separation in the usual manner yielded XXXI as prisms from ether.

EXAMPLE 24

*Protoverine 3,6,15,16 - tetraacetate 7 - isobutyrate (XXXIII).*—Protoverine 3,6,15,16 - tetraacetate (850 mg.), J. Am. Chem. Soc, 82, 2616 (1960), in pyridine (10 ml.) was treated with isobutyryl chloride (0.9 ml., ca. 7.5 mole equavilanets) and the solution was kept at room temperature for 12 hours and then at 60° C. for 6 hours. Workup in the usual manner, followed by two column separations yielded XXXIII.

EXAMPLE 25

*Protoverine 3,6,15 - triacetate 7 - isobutyrate (XXXIV).*—Methanolysis of XXXIII (130 mg.) by the procedure used for the preparation of XIII yielded XXXIV as prisms from ether.

EXAMPLE 26

*Protoverine 3,7,15 - triisobutyrate 6,16 - diacetate (XXXVII) and protoverine 3,15,-diisobutyrate 6,16-diacetate (XXXVI).*—Protoverine 6,16-diacetate (5.3 g.), J. Am. Chem. Soc., 82, 2616 (1960) in pyridine (60 ml.) was treated with isobutyryl chloride (2.7 ml., 3 mole equivalents). Workup and column separation in the usual manner yielded XXXVII and XXXVI. Crystallization of XXXVII from acetone-petroleum ether yielded needles.

EXAMPLE 27

*Protoverine 3,15 - diisobutyrate 6,7,16 - triacetate (XXXVIII).*—Acetylation of XXXVI (900 mg.) by the procedure used for preapration of IV yielded XXXVIII as prisms from acetone-petroleum ether.

EXAMPLE 28

*Protoverine 3,7,15 - triisobutyrate 6 - acetate (XXXIX).*—Methanolysis of XXXVII (1.4 g.) followed by column separation yielded chromatographically-homogeneous amorphous XXXIX.

EXAMPLE 29

*Protoverine 3,15 - diisobutyrate 6,7 - diacetate (XL).*—Methanolysis of XXXVIII (300 mg.) for 40 hours, followed by column separation yielded XL as prisms from ether.

EXAMPLE 30

*Protoverine 6,15,16-triacetate (XLI).*—Protoverine 6,16-diacetate (5.1 g.), J. Am. Chem. Soc., 82, 2616 (1960), in pyridine (60 ml. was treated with acetyl chloride (0.7 ml., ca. 1.2 mole equivalents). Workup in the usual manner and crystallization from acetone-petroleum ether afforded ca. 2 g. of starting material. The latter material was reacylated with 1.2 mole equivalents of acetyl chloride, and the products of both acylations were combined. Chromatography on alumina yielded chromatographically-homogeneous XLI. Crystallization from chloroform-ether yielded small prisms.

EXAMPLE 31

*Protoverine 3,7 - diisobutyrate 6,15,16 - triacetate (XLII).*—Protoverine 6,15,16-triacetate (XLI) (500 mg.) in pyridine (10 ml.) was treated with isobutyryl chloride (0.4 ml., ca. 5 mole equivalents). Workup and column separation in the usual manner yielded XLII which resisted all attempts at crystallization.

EXAMPLE 32

*Protoverine 3,7 - diisobutyrate 6,15 - diacetate (XLIII).*—Methanolysis of XLII (300 mg.) followed by column separation yielded XLIII as prisms from ether.

EXAMPLE 33

*Protoverine 6,15-diacetate (XLIV) and protoverine 6-acetate (XLVII).*—Protoverine (6.3 g.) in pyridine (75 ml.) was treated with acetyl chloride (1.6 ml., ca. 1.8 mole equivalents). Workup and column separation in the usual manner gave XLIV, crystallized from chloroform-petroleum ether and XLVII, crystallized from acetone-petroleum ether.

EXAMPLE 34

*Protoverine 3-isobutyrate 6,15-diacetate (XLV).*—Protoverine 6,15-diacetate (XLIV) (1.2 g.) in pyridine (50 ml.) was treated with isobutyryl chloride (1.2 ml., 4 mole equivalents). Workup and column separation in the usual manner yielded chromatographically-homogeneous amorphous XLV.

EXAMPLE 35

*Protoverine 3-isobutyrate 6,7,15-triacetate (XLVI).*—Protoverine 3-isobutyrate 6,15-diacetate (XLV) (600 mg.) in pyridine (4 ml.) and treated with acetic anhydride (0.17 ml., ca. 2 mole equivalents). After 15 hours at room temperature, workup and column separation in the usual manner gave XLVI as prisms from acetone-petroleum ether.

EXAMPLE 36

*Protoverine 3,15-diisobutyrate 6-acetate (XLVIII).*—Protoverine 6-acetate (XLVII) (1.7 g.) in pyridine (30 ml.) was treated with isobutyryl chloride (1.6 ml., ca. 5 mole equivalents). Workup and column separation in the usual manner yielded chromatographically-homogeneous amorphous XLVIII.

EXAMPLE 37

*Acetylation of protoverine 3,15-diisobutyrate 6-acetate (XLVIII) to protoverine 3,15-diisobutyrate 6,7-diacetate (XL).*—Protoverine 3,15-diisobutyrate 6-acetate (XLVIII) (750 mg.) in pyridine (20 ml.) was treated with acetyl chloride (0.5 ml., ca. 7 mole equivalents). After 14 hours, workup and column separation yielded XL, M.P. 221–222° dec., $[\alpha]_D^{24}$ —41° (c, 1.00 pyr.); infrared spectrum in chloroform identical with that of sample described above in Example 29.

EXAMPLE 38

*Protoverine 3,15-diisobutyrate (XLIX).*—Methanolysis of XLVIII (250 mg.) for 40 hours yielded XLIX, crystalized from ether.

The following table gives the melting points and $[\alpha]$ data for the compounds described above.

Table

| Compound | Protoverine Derivative | M.P.,° C. | $[\alpha]_D^{25}$ (py.) |
|---|---|---|---|
| II | 6,15-diisobutyrate | 190–191 | −34 |
| III | 3,7,16-triisobutyrate | amorph. | −11 |
| IV | 3,7,16-triacetate 6,15-diisobutyrate | 254–255 | −49 |
| V | 3,6,15-triisobutyrate 7,16-diacetate | 234–236 | −44 |
| VI | 3,7,-diacetate 6,15-diisobutyrate | 237–238 | −46 |
| VII | 3,6,15-triisobutyrate 7-acetate | 234–235 | −46 |
| IX | 3,6,16-triacetate 15-isobutyrate | 228–229 | −3 |
| X | 3,6,16-triacetate 7,15-diisobutyrate | 224–225 | −45 |
| XI | 3,6,7,16-tetraacetate 15-isobutyrate | 258–259 | −46 |
| XII | 3,6-diacetate 7,15-diisobutyrate | 252–253 | −46 |
| XIII | 3,6,7-triacetate 15-isobutyrate | 248–249 | −40 |
| XVIII | 3,7,15-triacetate 6-isobutyrate | 265–266 | −41 |
| XIX | 3,7,15,16-tetraacetate 6-isobutyrate | 219–220 | −51 |
| XX | 3,6-diisobutyrate | 160–170 | −10 |
| XXI | 3,6-diisobutyrate 7,15,16-triacetate | 210–212 | −44 |
| XXII | 3,6-diisobutyrate 7,15-diacetate | 262–263 | −40 |
| XXIII | 14,15-acetonide 6-isobutyrate 3,16-diacetate | 252–253 | +21 |
| XXIV | 3,15,16-triacetate 6-isobutyrate | 177–179 | −4 |
| XXV | 3,16-diacetate 6-isobutyrate | 232–233 | −7 |
| XXVI | 3,16-diacetate 6,7,15-triisobutyrate | 233–234 | −39 |
| XXVII | 3,15,16-triacetate 6,7-diisobutyrate | amorph. | −50 |
| XXVIII | 3,15-diacetate 6,7-diisobutyrate | 227–228 | −42 |
| XXIX | 3-acetate 6,7,15-triisobutyrate | amorph. | −38 |
| XXX | 3,6-diisobutyrate 15-acetate | 165–168 | −7 |
| XXXI | 3,6,7-triisobutyrate 15-acetate | 239–241 | −40 |
| XXXIII | 3,6,15,16-tetraacetate 7-isobutyrate | 257–259 | −46 |
| XXXIV | 3,6,15-triacetate 7-isobutyrate | 243–244 | −48 |
| XXXVI | 3,15-diisobutyrate 6,16-diacetate | amorph. | −16 |
| XXXVII | 3,7,15-triisobutyrate 6,16-diacetate | 232–233 | −37 |
| XXXVIII | 3,15-diisobutyrate 6,7,16-triacetate | 259–260 | −48 |
| XXXIX | 3,7,15-triisobutyrate 6-acetate | amorph. | −30 |
| XL | 3,15-diisobutyrate 6,7-diacetate | 222–223 | −42 |
| XLI | 6,15,16-triacetate | 242–243 | −18 |
| XLII | 3,7-diisobutyrate 6,15,16-triacetate | amorph. | −40 |
| XLIII | 3,7-diisobutyrate 6,15-diacetate | 214–216 | −37 |
| XLIV | 6,15-diacetate | 235–236 | −27 |
| XLV | 3-isobutyrate 6,15-diacetate | amorph. | −10 |
| XLVI | 3-isobutyrate 6,7,15-triacetate | 249–250 | −39 |
| XLVII | 6-acetate | 180–190 | −15 |
| XLVIII | 3,15-diisobutyrate 6-acetate | | −12 |
| XLIX | 3,15-diisobutyrate | 185–190 | −10 |

The products which appear to be of most interest at the present time are esterified in positions 3 and 15 and unesterified in position 16. Although the ester group at the position 3 can be either acetate or isobutyrate, esterification at position 15 with a branched chain acid (isobutyrate group) appears advantageous.

The novel ester products described above are characterized by insecticidal properties and can be applied in this field in standard diluents or carriers including dusts and liquids such as kerosene. They have been found effective (LD/50) against ordinary house flies in dilutions as low as 2 mg. per liter of diluent. For most purposes, concentrations of around .01–1.0% by weight are generally recommended.

I claim:
1. Protoverine 3,6,15-triisobutyrate 7-acetate.
2. Protoverine 3,7,15-triisobutyrate 6-acetate.
3. Protoverine 6,7,15-triisobutyrate 3-acetate.
4. Protoverine 3,15-diisobutyrate 6,7-diacetate.
5. Protoverine 6,15-diisobutyrate 3,7-diacetate.
6. Protoverine 7,15-diisobutyrate 3,6-diacetate.
7. Protoverine 3,6,7-triacetate 15-isobutyrate.

References Cited in the file of this patent

Kupchan et al.: Chemistry and Industry, December 6, 1958, page 1626.